UNITED STATES PATENT OFFICE.

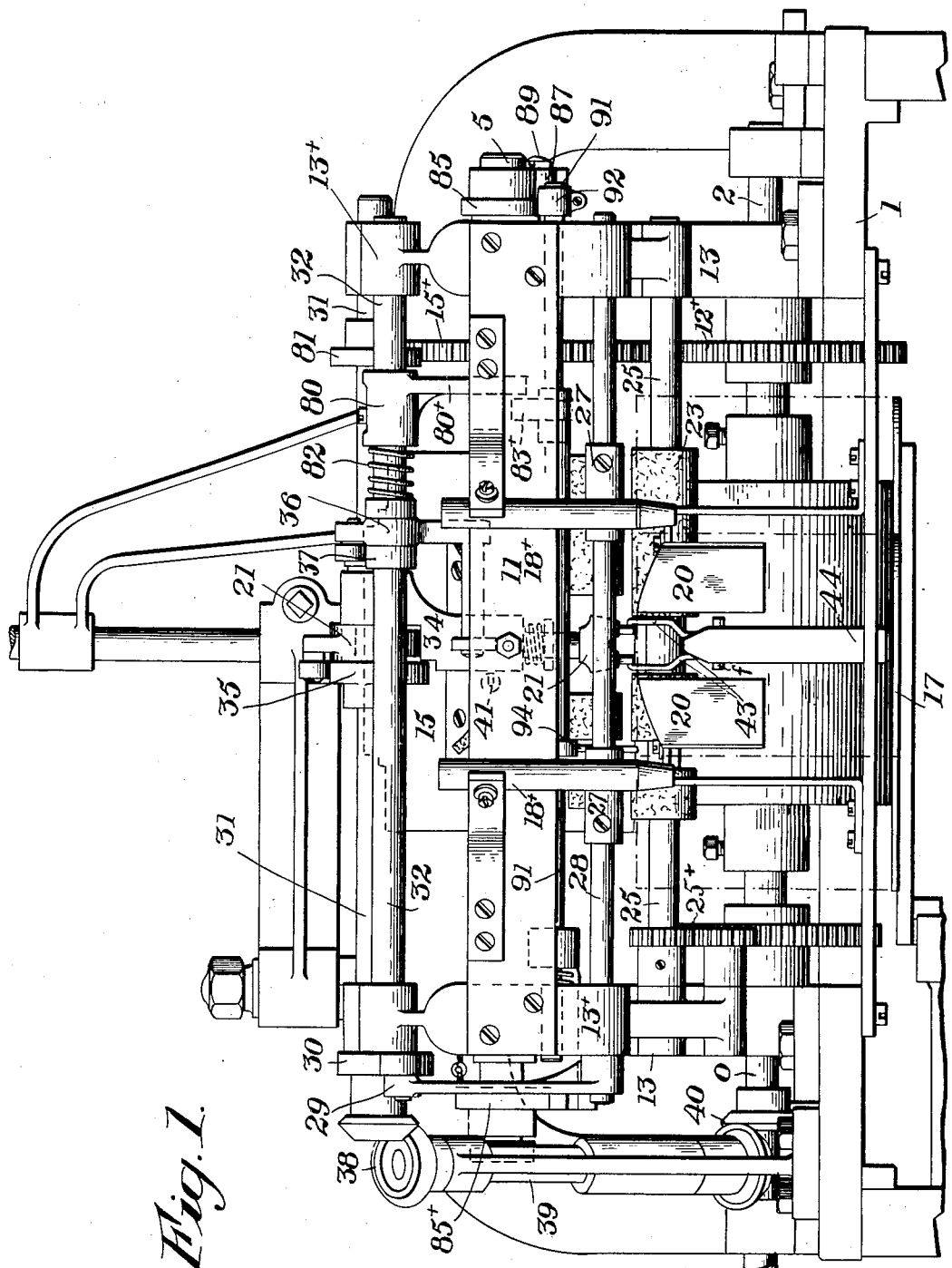

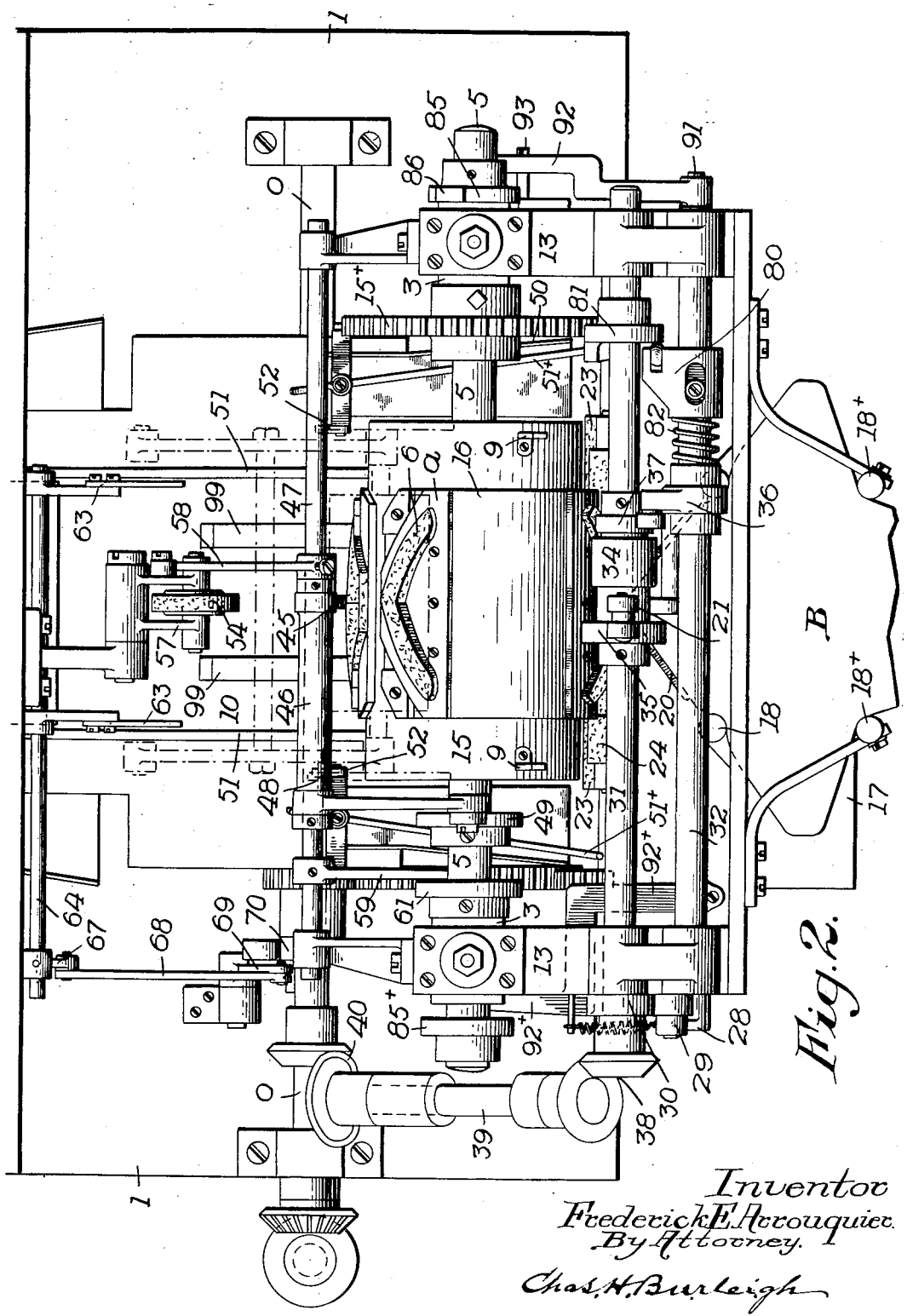

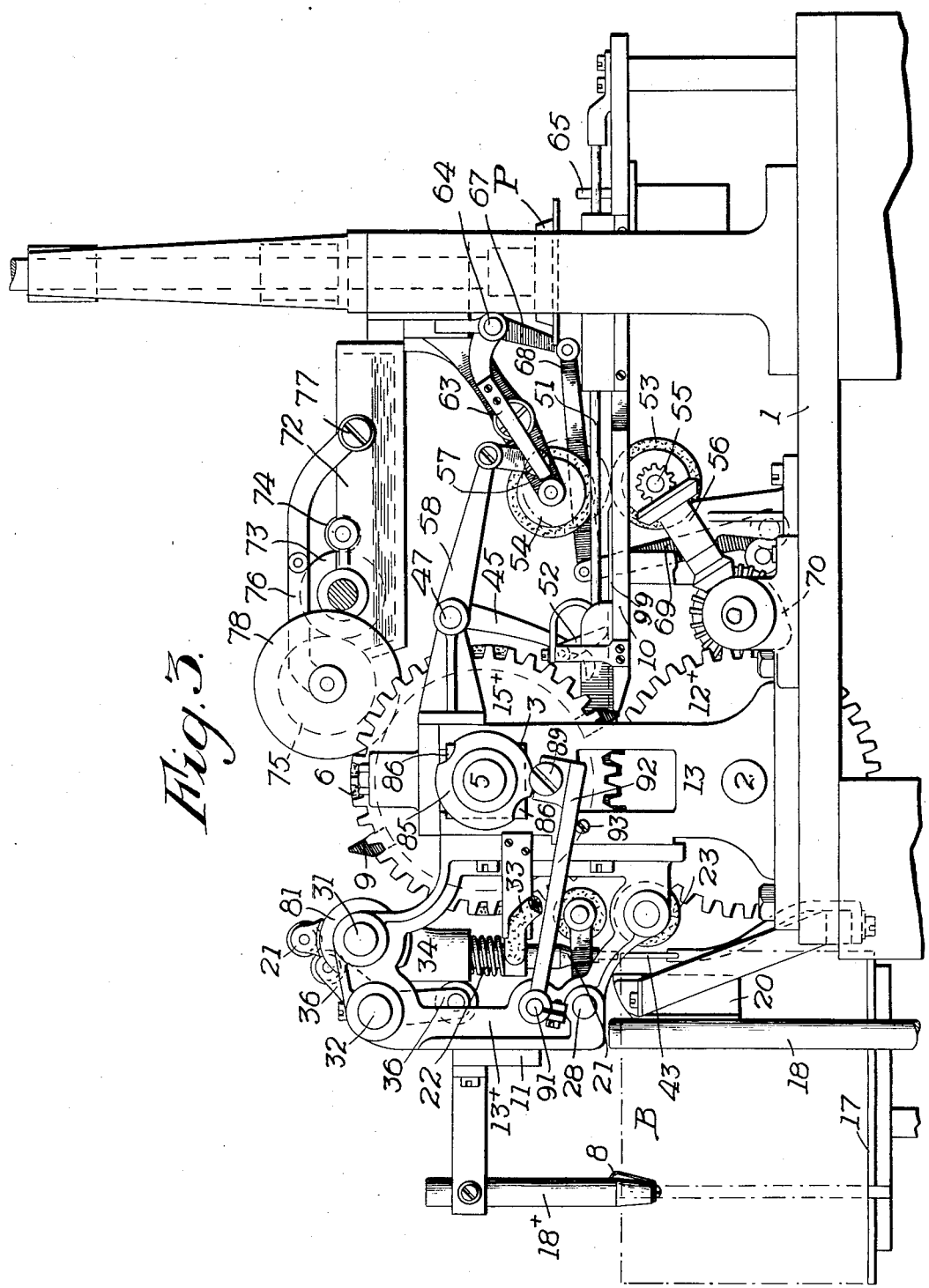

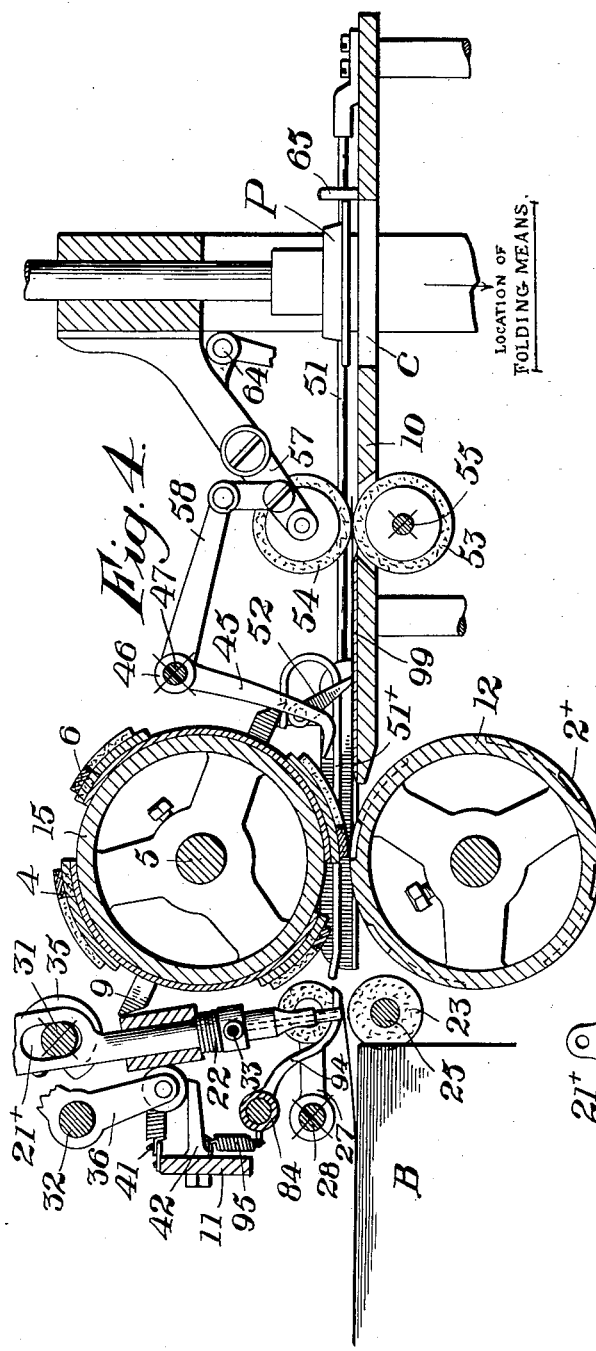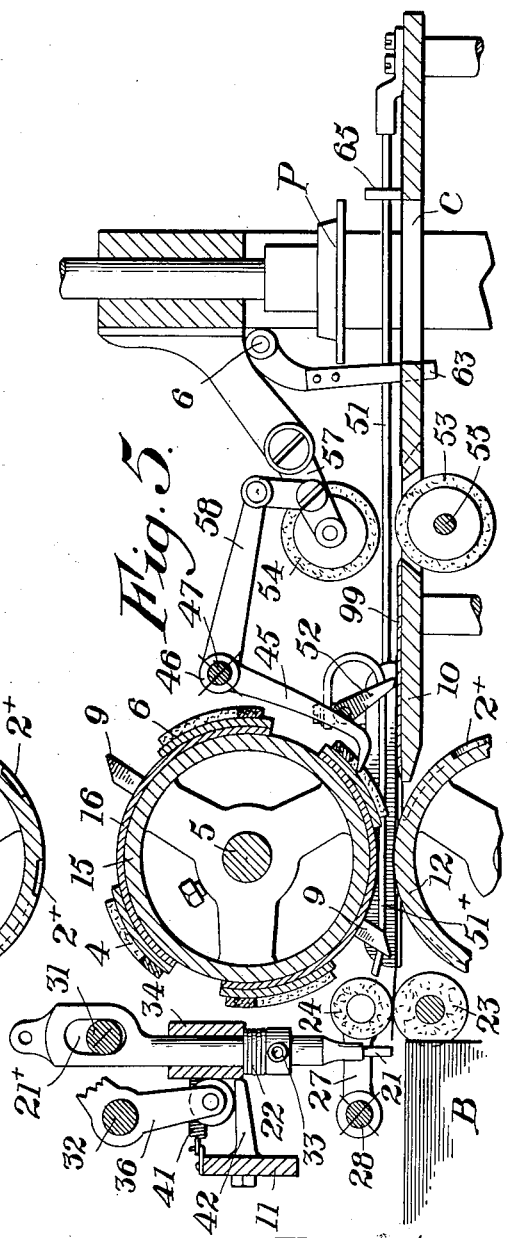

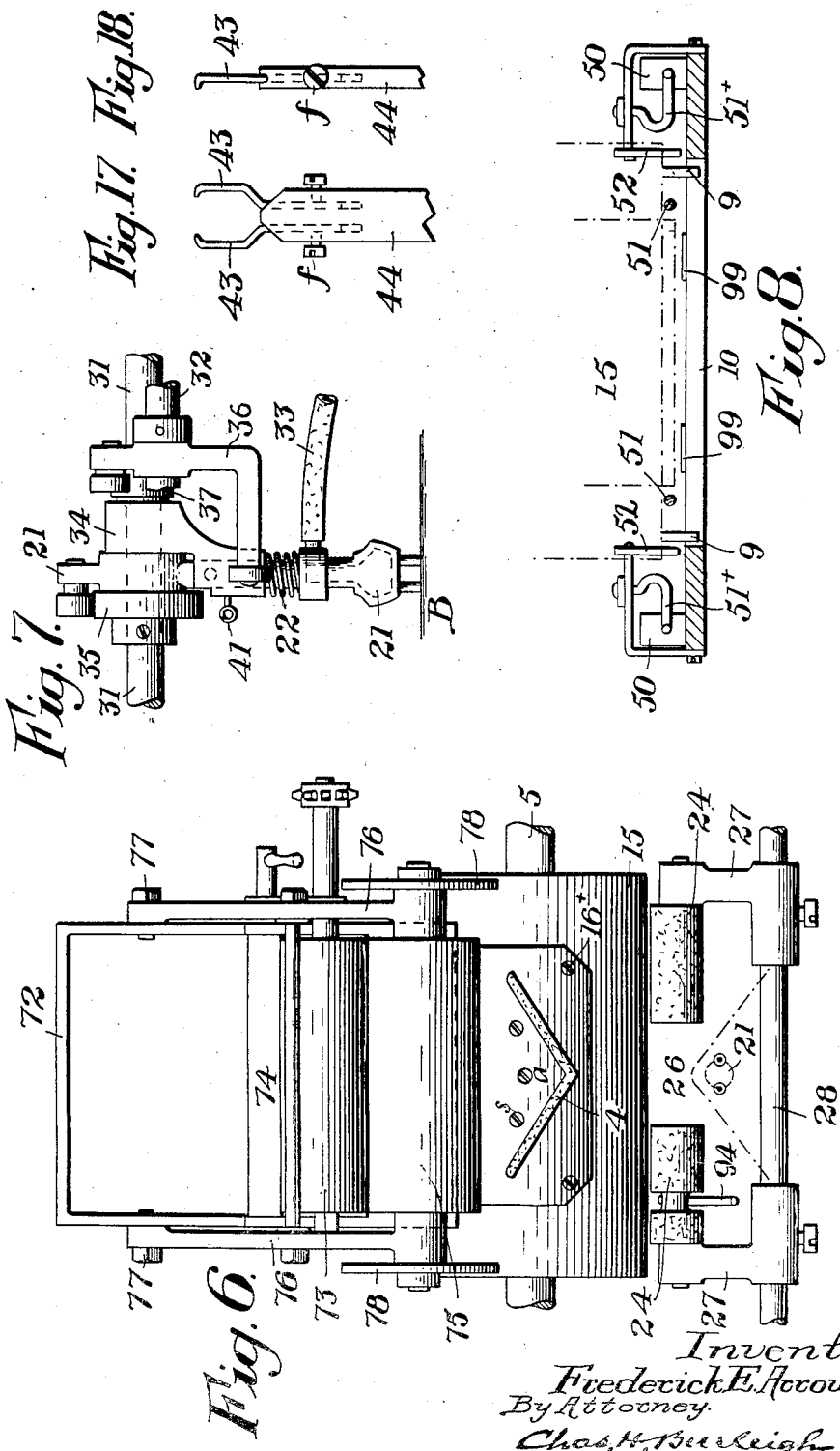

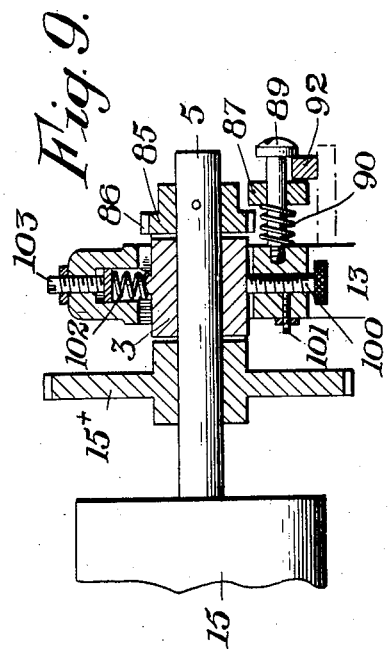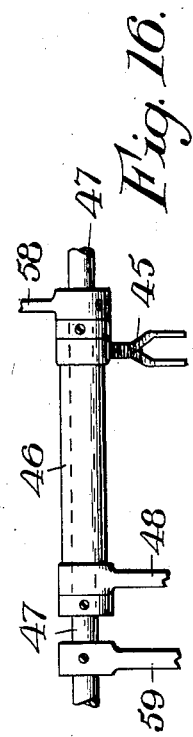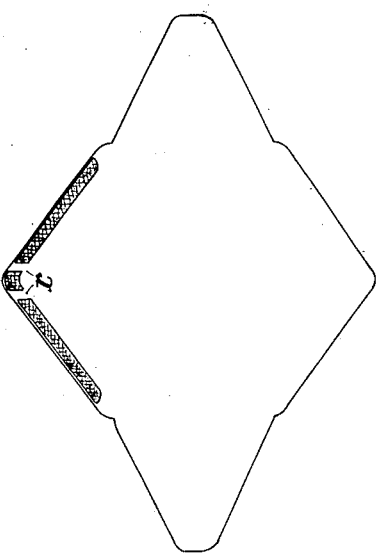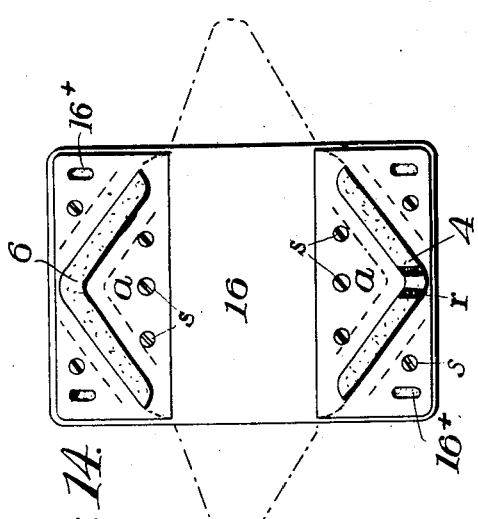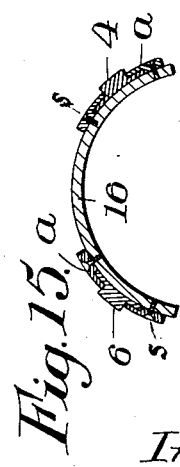

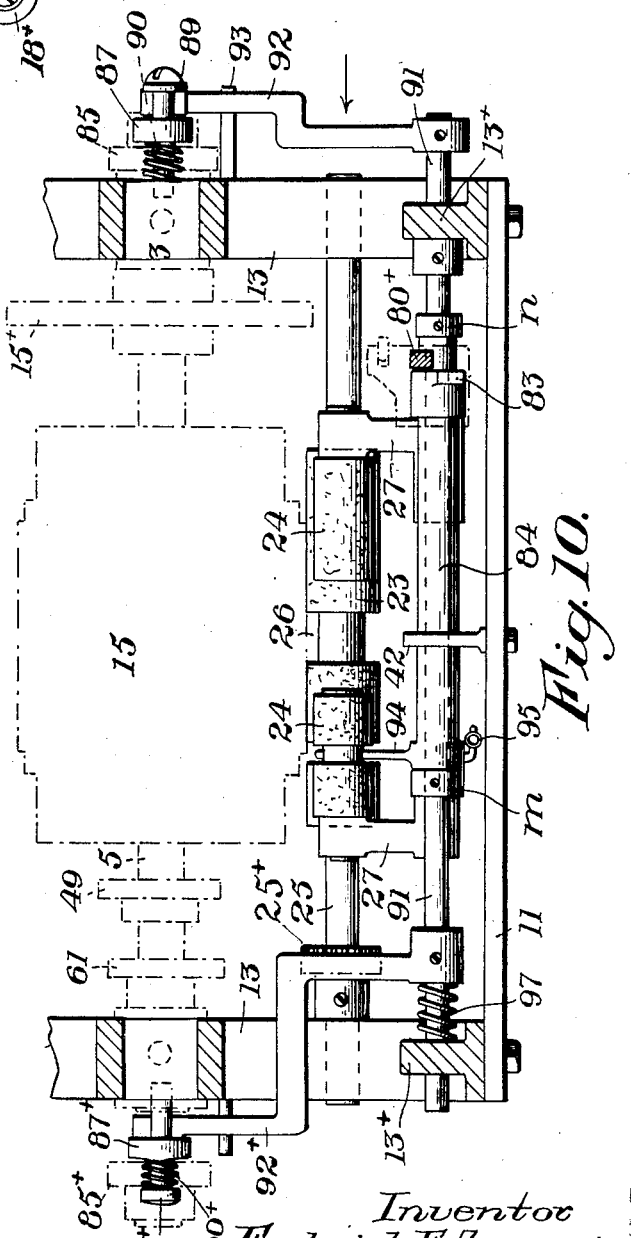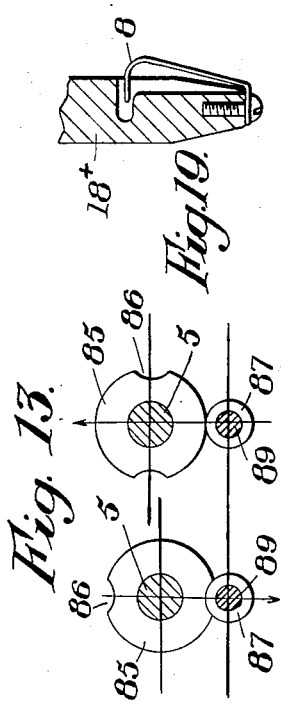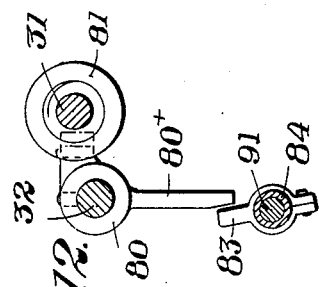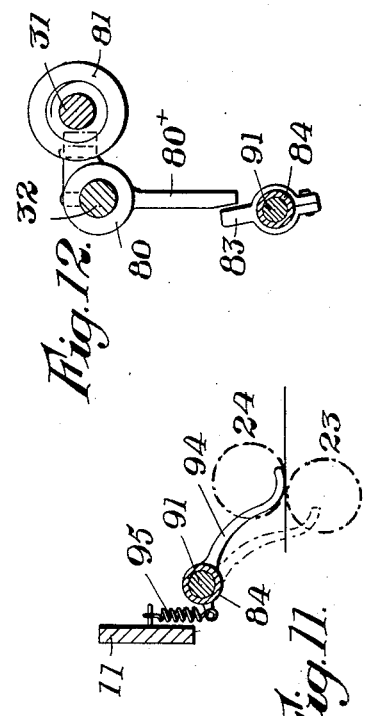

FREDERICK E. ARROUQUIER, OF SHREWSBURY, MASSACHUSETTS, ASSIGNOR OF ONE-HALF TO DANIEL HENNIGAN, OF WORCESTER, MASSACHUSETTS.

ENVELOP-MACHINE.

1,395,380.  Specification of Letters Patent.  Patented Nov. 1, 1921.

Application filed June 19, 1920. Serial No. 390,203.

*To all whom it may concern:*

Be it known that I, FREDERICK E. ARROUQUIER, a citizen of the United States, residing at Shrewsbury, in the county of Worcester and State of Massachusetts, have invented certain new and useful Improvements in Envelop-Machines, of which the following is a specification.

This invention relates to a novel construction, organization, and mode of operation in envelop-making machines; more particularly to the means for feeding, gumming and regulating the blanks as they are advanced from the supply-pack to the folding devices; the prime object being to provide a mechanism for the purpose specified, organized to operate successfully at comparatively high speed and with economic efficiency.

Another object is to provide a continuously moving gumming means for successively applying gum to the in-fold edge, and sealing edge, of a blank, and interveningly freeing or releasing the blank to the action of a regulating means adapted to insure accurate register of the blank for receiving the sealing gum.

A further object of the invention is the provision, in a machine of the class specified, of a rotatable gumming means, roller feed devices for advancing a blank thereto, second roller feed devices for advancing the blank therefrom, and means for releasing and regulating the blank intermediate to the action thereon of the respective roller feed devices.

Another object of the invention is to provide a rotatable gummer-cylinder provided with a plurality of sets of gum-applying pads or forms, each set removably secured to the gummer-cylinder by a separate curved seat-plate.

A further object of the invention is to provide a gumming mechanism comprising a bed-roll or cylinder, a gummer-cylinder having gum-applying forms upon its exterior, means for feeding envelop blanks between said cylinders, and devices carried upon one of the cylinders for regulating the position of the blank preceding the seal-gumming contact.

A further object is to provide a novel arrangement of mechanism of the character described for automatically preventing the imprint of gum when there is no blank presented for its reception.

The several objects of my invention and novel features of improvement in construction, organization and operation, will be appreciated from the following description, considered in connection with the accompanying drawings (7 sheets) which, for the purpose of illustration, represent such parts of an envelop machine as will disclose a practical embodiment of my invention; the particular subject matter claimed being hereinafter definitely specified.

In the drawings, Figure 1 is a front elevation view. Fig. 2 is a top plan view with the gum supply means omitted for clearer showing of the underlying mechanism. Fig. 3 is a side elevation view. Fig. 4 is a vertical sectional view of the blank-feeding and gumming means positioned as when a blank is being taken from the pack, and the preceding blank is passing from the gumming means toward the position where the folding is effected. Fig. 5 is a similar vertical section its parts positioned as when the blank is beneath the gummer cylinder. Fig. 6 is a partial top plan view of the gum-supply devices; the gummer cylinder and the upper feeding-in rolls. Fig. 7 is a front view of the pneumatic picker devices, separate from other parts. Fig. 8 is a partial vertical section transverse to the run-way and looking in the direction of the feed. Fig. 9 represents a vertical section at one end of the gummer cylinder axle; Fig. 10 a detail plan view of the means for preventing deposit of gum when a blank is not fed into the run-way, and devices for effecting automatic control of the same. Figs. 11 and 12 are detail views of the feeder-device and automatically controlled engaging means; Fig. 13 a diagram view illustrating the cylinder lift; Fig. 14 a separate flat development view of one set of gum-applying forms or pads and the attaching plate therefor; Fig. 15 a separate cross section of one of the removable curved attaching plates with a set of gum-applying pads fixed thereon; Fig. 16 a detail top view of the stripper finger or fork; Fig. 17 represents the front and Fig. 18 the side of a separator-claw for preventing duplication of blanks by the pickup action, and Figs. 19 and 20 represent a longitudinal section and end view of one of the front blank-guiding stakes.

With more particular reference to the accompanying drawings, wherein like reference characters indicate corresponding parts throughout the several views, the numeral 1 denotes the table or upper part of the envelop-machine frame, whereon the mechanisms embodying my invention are arranged and organized for operation as hereinafter explained.

The frame may be of such form as will suitably accommodate the operating parts. As illustrated, the plate or table 1 has fixed thereon, at right and left positions, upright housings, bearing members or brackets necessary for supporting the journals of the several shafts and working parts. Mechanism that is not herein illustrated, but which is in practice, required in a fully complete envelop-making machine, may be of well known or any suitable construction with which my present described improvements are applicable; since the essential features of my conception and invention more especially refer to those portions of the machine which are shown and herein desribed.

At a suitable height above the table 1 there is arranged an upper table or run-way plate 10, along which the envelop blanks travel when passing from the supply pack B at the front of the machine, to the creasing mouth C through which the blanks are depressed by the reciprocating plunger P into the folding devices located beneath the opening C, near the rear part of the table. The plunger and fold-forming means may be constructed and operated in the usual manner; therefore it is not herein specially illustrated.

The numeral 12 indicates a bed-cylinder or lower roll disposed in transverse relation to the run-way, with its axis shaft 2 rotatable in bearings in the upright housings 13; the top of said cylinder being approximately at the level of, or slightly above the plane of the run-way surface. Above, and parallel with the bed-cylinder, I arrange the rotatable gummer-roll or cylinder 15, its axis shaft 5 mounted in bearings 3 that are movable in the housings 13. The shafts of these two cylinders are operatively connected by gears 12+ and 15+, so as to rotate in unison.

The gummer-cylinder is provided with one or more sets of projecting gum-applying pads or forms 4 and 6, adapted for depositing the adhesive films of gum, or sticking substance, one upon the bottom flap or infold edges, and the other upon the sealing flap of the blanks as they are advanced between the rolling cylinders 12 and 15. The gummer cylinder 15 is preferably constructed to carry a plurality of sets of gum-applying pads; in the present instance two sets. The individual pads are best made of semi-elastic rubber, or similar material, formed of the required shape with flanges about their edges, and these flanges confined by overlying metal plates $a$ which are rigidly attached by screws $s$ to a curved seat-plate or segment 16 that fits upon the circumference of the cylinder, and is firmly but removably secured thereon by screws 16+; thus affording facility for interchanging the sets of gum-applying pads, if for any reason desired, without removing the cylinder from the machine. The holes in the curved plate 16 for the securing screws, are somewhat elongated so that the sets of gum-applying pads can be adjusted slightly forward or rearward on the cylinder by an adjustment of the seat-plate thereon, without disturbing the relation of the pads 4 and 6, one to the other.

The bed-roll or cylinder 12 is made somewhat shorter than the gummer cylinder 15, and is provided with depressions 2+ formed in its surface, countermating with the gum-applying pads 4 and 6 on the upper cylinder. These depressions are respectively formed somewhat wider than the gum-printing face of the pad, so that if a blank should in any case be scant, or disarranged, and the gum-printing face lap slightly beyond the edge of the blank, no gum can be deposited upon the exterior surface of the bed-cylinder to interfere with the proper operation; or if no blank is present the gummed faces of the pads would encounter only vacant spaces, thus keeping the mechanism clean of waste gum.

Upon the exterior of the gummer cylinder I provide outwardly projecting fingers or members 9 that act against the edge of the blank for effecting or insuring true register of the same, after the infold edge has received gum and before gum is applied to the sealing edge. The ends of said fingers or members 9 are best rounded or inclined at their front, as indicated, so as to smoothly withdraw from the blank when passing therefrom.

The supply pack of blanks B is supported upon an elevatable platform 17, and the blanks are kept in alinement by guide stakes 18 and 18+. Means for elevating the blank-supporter and keeping the top of the pack at proper level, may be of any well-known or approved construction; such means being common it is not herein shown.

20 indicates a pair of upright oppositely disposed stationary guard-plates, the function of which is to keep the edges of the blanks in even order for delivery. Said plates are positioned at either side of a central intervening space, and conform with the oblique edges of the leading flap of the blank. The upper edges of the guard-plates slant upward to a point terminating approximately at the level where the blanks are fed off singly in successive order.

The front guide-stakes 18+ for the pack of blanks are secured to, and depend from brackets attached to a cross-bar 11 at the front part of the frame, and their lower ends terminate at a position which admits of the blanks being charged onto the pack-supporter below their ends. The front stakes are each preferably provided at their lower ends with a backwardly inclined light-pressure spring 8 (see Fig. 19) adapted to act against the edges of the blanks and cause any inequalities to be evened against the plates 20. The upper end of said spring is arranged to swing into a longitudinal slot formed in the stakes, while the lower end thereof may be formed with an eye and fixed to the end of the stake by a screw or other fastener.

Between the supply pack B and gummer-cylinder, I provide feeder mechanism for taking the topmost blank from the pack and advancing it to the gumming means. Said feeder-mechanism comprises a movable pneumatic picker 21 and feed-rolls 23 and 24. Said rolls are preferably made with their outer portion formed of semi-elastic rubber or other equivalent substance, while their central portion is of metal. The lower feed-roll 23 is fixed upon a rotating shaft 25 mounted in bearings upon the supporting frame, and operated by gears 25+ from the bed-cylinder axle, or other convenient part of the machine. The upper feed-roll 24 and its axle are divided centrally into two sections with an intervening space 26, (see Fig. 6) to accommodate the picker 21. The axles of the upper feed-rolls are mounted in swinging members 27 fixed upon a rockable shaft 28 mounted in bearings on the frame, and provided with an arm 29 carrying at its outer end a stud roll that runs in contact with the face of a cam 30 secured upon the upper shaft 31, and by which means a controlled up and down movement is imparted to the roll 24 toward and from the lower feed-roll 23.

The picker 21 consists of an endwise movable stem or body, hollow at its lower part and provided with a pair of downwardly projecting sucker nozzles open at their lower ends; also furnished with a pipe or opening 33 that communicates with the interior of the body and through which air may be intermittently exhausted by a conveniently disposed pump or other suitable means (not shown) operated in connection with some operating part of the machine; the effect of such exhaust being to cause a blank to temporarily adhere to the sucker nozzles and to be thereby lifted, moved forward and entered into the bite of the feed-rolls. The body of the picker extends through a guide or sleeve 34, the upper part of which is mounted upon the cam-shaft 31, so that its lower part can swing back and forth; and said body is best formed with a laterally flat head, longitudinally slotted at 21+ to embrace the shaft. The upper part of this head is furnished with a stud-roll that runs upon the face of a cam 35 fixed upon the cam shaft 31. A rod or stationary shaft 32 is arranged near and parallel to the cam-shaft 31, both mounted in brackets 13+ attached to the housings 13, and an angle lever 36, fulcrumed upon the rod near the picker, has one arm provided with a stud roll that acts against the sleeve 34, while its other arm is provided with a stud roll that engages with a cam 37 fixed upon the cam shaft 31, and which actuates said angle lever. The head of the picker body and swinging guide-sleeve 34 are laterally confined upon the shaft 31 between the two cams 35 and 37, so that the picker can move up and down and back and forth; but can have no rotative movement within the guide; hence the sucker nozzles maintain their proper relation in respect to their plane of action.

In the present instance the cam-shaft 31 is actuated by the gears 38, inclined shaft 39 and gears 40 from the operating shaft 0.

The picker is lifted by the cam 35 mounted on the shaft 31 and is depressed by a spring 22 arranged about its body beneath the guide bearing or sleeve in which the picker is mounted. It is moved in opposition to the angle-lever by a suitable spring 41 which connects it with the cross-bar 11, and a stop-member 42 is provided for arresting the forward movement or swing of the guide sleeve and picker when the nozzles are at the required position above the pack of blanks.

At the edge of the pack B there is preferably arranged a separator claw 43 adapted to coöperate with the picker for preventing more than a single blank being taken up at each action. Said claw consists of a pair of wire points projecting from the upper end of a standard 44 supported on the frame; the ends of said points being slightly hook-shaped to drag across the edge of the blank as it is lifted from the pack so that if more than one blank should start to follow the picker, all but the topmost one will be caused to fall back upon the pack. The claw wires 43 are best made endwise adjustable in the standard, and retained by set screws *f*, thereby permitting accurate regulation of the claw to conform in the best manner to the picker action. The standard may be adjustable upon its base.

45 indicates a swinging finger for stripping the blank from the gummer pads. Said finger is fixed upon a sleeve 46 mounted on the shaft 47. Said sleeve is furnished with an arm 48 carrying a stud roll that engages with a cam 49 mounted on the axis shaft of the gummer-cylinder 15, whereby the action of the stripper finger is rendered synchronous with the advance of the gummed blanks. The end of the finger 45 is preferably furcated, and offset as indicated in Fig. 16, and narrow recesses r may be formed in the gummer-pad 4 to avoid getting gum on the finger points.

50 indicates upright inwardly inclined wing guards for keeping the blanks in proper alinement laterally.

51 indicates guard rods parallel with the run-way, and beneath which the blanks pass; 51+ indicates short guard rods serving to prevent lifting the blank by adhesion of the gum imprinted thereon by the gum-applying pads.

52 indicates finger members loosely pivoted at their upper ends adjacently in rear of the gummer-cylinder and extending rearwardly downward, and adapted to drag their lower ends upon the surface of the blank for affording a slight friction and steadying action when the run-way plate and blank is otherwise free, and when acted upon by the register regulating means.

At a suitable distance in rear of the gum-applying means for feeding the gummed blanks therefrom, I arrange a second pair of feed rolls 53 and 54, disposed centrally of the run-way 10, and having comparatively narrow faces. The under roll 53 is fixedly mounted upon a rotatable shaft 55 driven by suitable gearing and the intermediate shaft 56 from the operating shaft 0. The top of said roll 53 is approximately in line with the run-way, or slightly above the surface thereof. The upper roll of this pair is combined with means for effecting upward and downward action thereof. In the present instance it is journaled in bearings upon an upwardly and downwardly movable or swinging carrier 57 mounted upon a bracket fixed upon a stationary part of the frame. Said carrier is operatively connected or linked to an arm 58 fixed upon the rocker shaft 47; the movement thereof being controlled by a cam 61 fixed upon the axis-shaft of the gummer-cylinder, and co-acting with an arm 59 fixed upon said rocker-shaft. These feed-rolls 53 and 54 are located intermediate the gumming and folding devices, in such relation thereto that they will take the blank as it is leaving the gumming means, and advance it into position beneath the plunger P ready for depression through the mouth C into the folding mechanism.

It will be understood that the means for folding the blanks into finished envelop form may be of the usual well known character and operation; therefore the fold-forming members have not been herein illustrated. The plunger P may also be operated in the usual manner.

To cause the gummed blanks to register in true position for folding, I provide means comprising a pair of arms or finger members 63 mounted upon an overlying rocker-shaft 64, and adapted to swing or move against the latter edge of the advancing blank approximately at the instant it is released from the bite of the second feed-rolls; thereby causing the opposite edge of the blank to impinge against upright stationary lugs or stakes 65 located at the opposite angles of the creasing mouth C. The swing of the fingers is adjusted so as to bring their faces only to a position in relation to the stakes 65 that will correspond substantially to the dimension of the blank, which is thus instantaneously confined between four positioning members as the plunger descends.

The finger-supporting shaft is given sufficient rocking movement to carry the fingers across the edge of the blank and to register position, and then to swing back out of the way of the next following blank. In the present instance said shaft has an arm 67 fixed thereon which is pivotally connected by a link 68 to the end of a swinging arm 69, movement of which is controlled by a suitable cam 70 rotating with the power shaft 0.

The gum-box or reservoir 72, containing the supply of adhesive material, is arranged at the upper part of the machine. A gum-delivery roll 73 is mounted to revolve within said reservoir, and a doctor bar or scraper 74 is provided for regulating the quantity of gum taken up thereby. Said delivery-roll may be operated by a sprocket and chain from any convenient part of the machine. A transfer-roll 75 is located in parallel relation thereto, the face of which receives gum from said delivery-roll, and in turn transfers it to the printing faces of the gum-applying pads at or near the top of the cylinder 15. The axis-shaft of the transfer-roll is mounted to turn in bearings upon the front end of the swinging frame 76 that is pivoted at 77 to permit an up and down movement or lifting of the roll. Said axis-shaft has arranged thereon a disk, or disks 78 which roll upon the periphery of the gummer-cylinder; the diameter of the disk being somewhat greater than that of the transfer-roll, keeps said roll from approaching within a predetermined distance from the face of the cylinder; thereby preventing contact of the transfer-roll surface, excepting with the faces of the gum-applying pads 4 and 6; these while passing under the transfer-roll may slightly lift the disks from the cylinder, permitting the entire weight of the roll to bear upon the pad surface so as to insure a sufficient deposit of gum thereon.

The axle or shaft of the gummer-cylinder, which is mounted in bearings 3 that are movable up and down in the housings, is provided at or near its end with a cam or circular member 85 having concavities 86 located at predetermined positions thereon in correlation to the positions of the gum-applying members on the cylinder. Below said circular member, and of a dimension approximately matching the circular concavities, there is a roll 87 mounted to rotate upon a stationary stud or support 89 fixed to the housing. Said roll is so positioned that it can readily slide laterally into and from the concavities 86 when the parts are in coinciding relation. The roll 87 is slidable on its supporting stud, and is normally pressed laterally out of alinement with the member 85 by a suitable spring 90 disposed between the roll and frame. (See Fig. 9.) Outward movement by the spring pressure is limited so that the roll may just clear the cam member 85, when the parts are out of alinement. A similar cam member 85+ and roll 87+ is arranged at the opposite end of the gummer cylinder axle.

Means is provided for moving the rolls 87 and 87+ into and from the concavities 86 in the respective cams. In the present instance such means comprises an endwise movable rod or bar 91 slidably mounted in the frame, and provided with arms or members 92 and 92+ that are respectively adapted to shift said rolls 87 and 87+ laterally upon their supporting stud, to bring them into and out of alinement with the cam members 85 and 85+.

Upon the stationary shaft 32 I arrange a slidable head or sleeve 80 having an anti-friction roll mounted thereon, which runs against the face of a sidewise-acting cam 81 mounted upon the rotating cam-shaft 31, and adapted for moving the head endwise in one direction; while an expansion spring 82 is arranged between the opposite ends of the head, and a collar fixed on the shaft 32; which spring tends to press the head toward the cam. (See Figs. 2 and 12.) The head is rendered non-revoluble by a slot and stud, as indicated, or by other equivalent means. The under part of the head 80 is provided with a projecting member or finger 80+ rigidly fixed thereon, and extending into engaging relation with a projecting lug or member 83 fixed upon a rockable sleeve 84 mounted to oscillate free upon the rod 91, but confined against endwise movement, independently of said rod by collars m and n tightly secured upon the rod at the respective ends.

Fixed upon the rocking sleeve 84, adjacent to the entrance to the first feed-rolls, I provide a feeler 94 that intercepts the path of the entering blank, and is raised by the blanks passing beneath its end, but is allowed to drop when no blank is present; thus rocking the sleeve and swinging the lug into and from engaging alinement with the projection 80+ on the head 80. A suitable spring 95 is combined with the feeler or sleeve to assist its quick action.

Movement of the rod or bar 91 and parts actuated thereby, is positively effected from the cam 81 and sliding head 80, and is automatically controlled by the blank-actuated feeler. At each revolution of the cam the head 80 is moved endwise at a predetermined instant by the swell of the cam acting against the roll in the end of the head. Under normal conditions, with the feeler raised upon the in-feeding blanks, there is no further effect, except that the spring 82 returns the head to primal position; thus producing merely a reciprocative action of the finger 80+ past the retractive lug. But when no blank is entered and the feeler drops, the lug 83 is thrown up into the path of the finger 80+ which then contacts therewith and pushes the rod 91 endwise, in opposition to its spring 97, and by its arms, thus causing the rolls 87 and 87+ to enter one of the cavities 86 in the cam-members 85 and 85+, then the further rotation of the cylinder axle causes the cam-members to ride up on the top of the rolls 87 and 87+, thereby lifting the gummer cylinder 15 sufficiently to prevent contact of the gum-applying pads with any of the underlying parts. This lifting action occurs at each half rotation of the cylinder, or at each feed interval so long as there is no blank entered beneath the gummer-cylinder, or until the lug 83 is retracted from the path of the finger 80+, by the entering of another blank to the in-feed rolls.

The run-way plate 10 is preferably provided with a plurality of parallel narrow longitudinal strips or ways 99 upon its surface, which serve to carry the traveling blanks slightly above the plate surface and permit air to enter beneath them, thereby to avoid friction or resistance, and to facilitate a more rapid operation of the machine.

The journal-box housings 13 for the gummer-cylinder axles 5, are best provided with means for regulating the position of the box 3, as indicated in Fig. 9, comprising a bottom supporting screw 100 threaded into the body of the housing, and upon which the box rests; a set-screw 101 for preventing said supporting screw from displacement; a down-pressure spring 102 arranged within the housing cap and pressing upon the top of the box, and a bearing plate and adjusting screw 103 threaded in the top of the cap for controlling the spring tension and regulating the pressure of gumming contact.

In the operation: a downward movement of the picker brings its nozzles down upon the top of the pack of blanks; at the same instant air is exhausted from the picker, causing the topmost blank to be sucked against the mouths of the nozzles. The picker is then elevated and swung rearward, causing the edge of the selected blank to be inserted into the bite of the first feed-rolls, the upper roll of the pair being closed down upon the blank, and at the same instant air is allowed to enter the picker relieving its hold upon the blank which is advanced by said feed-rolls to pass under the gummer-cylinder. The gum for the in-fold or bottom edge of the blank is first imprinted thereon by the pad 4, and the gummed edge released from said pad by the stripper finger 45, leaving the blank free for an instant before the seal-gumming pad 6 contacts therewith. During that free instant the points or fingers 9 move against the latter edge of the blank, one at each side of the central line, and effect or insure accurate register of the blank to correspond with the proper seal-gum position; the register regulating action occuring after the infold edge has received its gum, but before the seal-gumming pad contacts with the advancing blank, which is being continuously moved, passing under the drag members 52 while register regulating fingers act against its edge.

The contact and movement of the seal-gumming pad 6 advances the blank until its leading edge enters between the second pair of feed-rolls; the upper roll 54 being raised and held elevated until the gummed edge of the blank is sufficiently far along to avoid liability of the gummed surface contacting with the feed-roll. The upper roll is then brought down upon the blank and the pair feed the blank away from the gumming cylinder and advance it to the creaser mouth C beneath the plunger P. When near that position the fingers 63 are moved down and against the edge of the blank and force it lightly against the arresting studs 65, which brings it into accurate register ready for the descending plunger to carry it down into the folders where it is completed in the usual manner. As soon as one blank has passed the rotating gummers a second blank is presented thereto by the feeding-in devices, so that in the regular operation two blanks are advancing through the mechanism at the same time, while a third is being folded; thus giving high efficiency in operation.

What I claim is—

1. In an envelop machine, in combination, a rotary gumming mechanism comprising a bed-cylinder, and a coacting gummer-cylinder provided upon its exterior with gum-applying pads formed for imprinting gum successively upon the infold flap and sealing flap in place of edges of an envelop blank; said mechanism being adapted to afford an instant of release to the blank after the gumming contact with the first or infold edge of the advancing blank and before the gumming contact with the last or sealing edge of the blank by the respective pads, means for regulating the register of the blank during the instant of its release, means for rotating said cylinders, and means for feeding the blank to said gumming mechanism.

2. In an envelop machine, the combination, of a rotatable gummer element provided with gum-applying surfaces respectively formed and disposed for successively depositing gum upon the infold-edge, and then upon the sealing-edge of a constantly moving blank, means for feeding blanks to said gummer, a second means for feeding blanks from said gummer, and means for automatically regulating the position of the blank to register with the seal-gumming surface, said register-regulating means arranged to act after the contact of the in-fold edge gummer, but before contact of the seal gummer, means for releasing the blanks from adherence to the gumming faces, rearward swinging drag members that rest upon the top of the blank, and means for operating the gumming and feeding mechanisms.

3. In a mechanism for the purpose specified, in combination, means for selecting and feeding envelop-blanks, a bed-cylinder, a gummer-cylinder provided with pads adapted for placing gum upon the leading and following edges of blanks while passing between said cylinders, a pair of projecting members carried by one of said cylinders and adapted to contact with the latter edge of the advancing blank as the cylinder rotates, said projecting members being disposed for indicating the register position in relation to the seal gummer pad.

4. In a machine of the character described, the combination with an elevatable support for a pack of envelop blanks, means for picking up the topmost blank, a set of feed-rolls adjacent thereto, means for moving the picking-up member to insert the edge of the blank into said feed-rolls, a runway for blanks, a rotating gummer-cylinder provided with projecting gumming faces, and a bed-cylinder arranged to receive the blanks from said feed-rolls, register perfecting projections carried upon the periphery of said gummer-cylinder, means for supplying gum to said gum-positioning faces, and means for transferring the blank from the gummer cylinder to the position for folding; said parts being relatively disposed and operating as set forth.

5. In a machine of the character specified, in combination with means for feeding envelop blanks thereinto, a rotating gumming mechanism including a rotary gummer element carrying a plurality of gum-applying sets, each set comprising in paired relation an in-fold gummer face and a seal-gummer face arranged for applying gum along the opposite edges of the envelop blank, said gummer element being provided near its ends with radially projecting members revoluble therewith and positioned to follow and contact with the rear edge of the blank, and means for affording slight resistance or friction upon the front edge of the advancing blank, said members relatively disposed for regulating the position of the blank intermediately of the respective gummer-face contacts, substantially as set forth.

6. In an envelop machine, a rotary gummer-cylinder carrying a plurality of sets of gum-applying pads each set including a bottom-edge gum-pad and a seal-edge gum-pad, said pads being individually secured in their proper relation to each other, upon a separate curved seat-plate that is fitted upon and removably attached to the exterior of the gummer-cylinder body.

7. In an envelop machine, including a rotating gummer-cylinder provided with projecting gum-applying pads upon its exterior; the combination of gum-delivery means including a transfer-roll adapted for contact with the faces of said gum-applying pads for charging gum thereon, a swinging frame pivoted upon the gum-reservoir, and having said transfer-roll journaled to turn freely in bearings at its front end and swing toward and from said rotating cylinder, the axle of said transfer roll being provided with roller-disks mounted thereon that roll upon the periphery or a surface concentric with the gummer-cylinder axis.

8. In an envelop machine, the combination with the gummer-cylinder having gum-imprinting pads upon its periphery, a gum-supply reservoir, a gum-delivery roll, a swinging bearing frame, and a gum-transferring roll journaled therein and adapted to contact with said gum-applying pads, said gum-transferring roll provided upon its axle with disks that roll upon the periphery of said gummer-cylinder, said disks being of greater diameter than the transfer-roll, for the purpose set forth.

9. In an envelop machine, the combination substantially as described of a bed-cylinder and a rotating gummer-cylinder having gum-applying pads for imprinting gum upon the leading in-fold edge and sealing edge of the envelop blanks passing therethrough, of a stripper-finger consisting of a depending swinging arm having an offset bifurcated end adapted for engaging the apex of the in-fold flap, the leading gum-applying pad being provided with recesses for the clear passage of said finger end, and means for imparting vibratory movement to said stripper synchronous with the action of said gummer-pads.

10. In an envelop machine of the character described, the combination as specified, with the rotating gummer-cylinder having gum-applying forms thereon for successively gumming the in-fold and sealing portions of a blank; of a stripper consisting of a depending unitary centrally disposed finger having the bifurcated lower extremity offset toward the lower part of said cylinder, a rocker member upon which the upper end of said finger is supported, an arm fixed upon said rocker member, and a rotating cam mounted upon the axle of said gummer-cylinder and co-acting with said arm for actuating and controlling movement of said stripper-finger, as and for the purpose set forth.

11. In an envelop machine, in combination substantially as described, blank-feeding instrumentalities, a rotary gumming mechanism adjacent thereto, including a gummer cylinder having pads for applying gum upon the in-fold edge and sealing edge of the blank; a centrally arranged depending finger, its lower end co-acting with said gummer-cylinder, a sleeve member having the upper end of said finger fixed thereon, a rocking shaft whereon said sleeve member is rockably supported; said sleeve and shaft each provided with an arm, cams fixed upon the axle of the gummer-cylinder and respectively engaging said arms for independently rocking said sleeve member and supporting shaft, means for receiving the blank from the gummer-cylinder and positioning it for folding, consisting of a single pair of narrow feed-rolls disposed centrally in the feed way to act upon the blank issuing from the rotating gummers, the under roll of said pair mounted upon a rotatively driven shaft, the upper roll mounted to turn loose in bearings upon a swinging support, and a link connecting the same to an arm fixed upon said rocking shaft, said parts being constructed, arranged and organized for operation in the manner set forth.

12. In an envelop machine, in combination, with instrumentalities for selecting and delivering envelop blanks, rotating gum-applying mechanism carrying pads for gumming the oppositely inclined in-fold edge and sealing edge of an envelop blank, and fold-creasing devices comprising a crease-defining opening and vertically reciprocating plunger; of means for propelling the gummed blanks from the gum-applying mechanism and positioning the same for said fold-creasing devices, said means consisting of a pair of centrally disposed narrow feed-rolls one of said rolls being fixed upon a positioned rotatably driven shaft, the other roll being freely rotatable upon a support adapted to have up and down movement to and from said driven roll, and means for operating said feed-rolls synchronously with the gumming operations.

13. In an envelop machine, the combination as described with blank-feeding instrumentalities, and rotating gumming devices to which the blanks are successively introduced thereby a forming means consisting of a creaser-mouth opening in the runway plate, and a reciprocating plunger that forces the blank through said opening; of means for advancing the blanks from said gumming devices, said means comprising an automatically separable pair of feed-rolls disposed for receiving the blanks as they issue from the rotating gumming devices, and delivering the same beneath said plunger; means for operating said feed-rolls, means for opening and closing the pair of rolls to receive and advance the gummed blank, and a rocker carrying a pair of finger members adapted to move into contact with the edge of the blank to register said blank with the creaser-mouth ready for folding, and means for actuating said rocker.

14. In an envelop machine of the character described, in combination with means for delivering envelop blanks, rotary gumming devices and feed-rolls for advancing the gummed blank; a run-way table having a plurality of parallel narrow stationary strips or ways longitudinally along its surface at positions intermediate to the width of the body of the blank and upon which the gummed blanks are supported above the table surface.

15. In an envelop machine, having blank-feeding instrumentalities, adjacent in-feeding rolls rotating gumming means comprising a bed-cylinder, and a gummer-cylinder carrying gum-applying pads for impressing adhesive upon the flaps of the blanks passing between said cylinders, the gummer-cylinder axles mounted in bearings movable toward and from the bed-cylinder axis, cam-members fixed upon said axles and having peripheral concavities therein, rolls supported and slidable upon fixed studs below said cam-members and adapted to be moved laterally into and from said concavities, means for automatically shifting said rolls into and from engagement with said cam-members, and a controlling means therefor including an oscillatable trip-member provided with a feeler-finger positioned in the path of in-fed blanks adjacent the entrance to the in-feeding rolls.

16. In an envelop machine of the character described, the combination of rotating gumming means, blank-feeding devices, a pair of feed-rolls for receiving blanks singly and advancing them to the gumming means, cam-members upon the axles of the gummer-cylinder, having recesses in their peripheries, rolls supported adjacent to said cam-members and adapted to move laterally into and from said recesses, an endwise movable rod having arms for shifting said rolls, an endwise sliding head mounted upon a shaft parallel with said rod and having a projection thereon, a rotatable cam-shaft and cam for moving said sliding head, suitable springs for retractive action of the several parts, a rockable sleeve mounted upon said endwise movable rod and confined against independent endwise movement thereon, said sleeve provided with a rigid member that moves into and from alinement with the projection on the sliding head by the rocking of said sleeve; and a feeler fixed on said sleeve and extending into the path of the blanks between said feed-rolls.

17. In an envelop machine, the combination with the run-way plate, blank feeding instrumentalities and rotating gumming mechanism; of swinging drag members located rearward of the gummer-cylinder, said drag members each consisting of a gravity-actuated bar pivotally suspended at its upper end to have free swinging action in the direction of the feed, and rearwardly downwardly inclined with its lower end adjacent to the run-way plate and adapted to drag upon the passing blank, for the purpose set forth.

18. In a mechanism of the character specified, a gummer element comprising a cylindrical body, and a plurality of pairs of semi-elastic gum-applying members, respectively formed and disposed for gumming the inner fold edge and sealing edge of an envelop blank, said semi-elastic members individually confined in their determined pair relation upon a curved seat-plate, by rigid attaching means, the seat-plate for each pair fitting the cylindrical body and mounting independently adjustably attached thereto, so that the seat-plate with the pair of gum-applying members thereon can be removed and replaced as a unit and means positioned upon said cylindrical body for the alinement of the blanks with the seal-gumming members.

19. In an envelop machine, a rotary gummer-cylinder furnished with semi-elastic gum-applying pads of the character described, said semi-elastic pads being provided with integral outstanding flanges about their base, and secured in position by rigid clamp-plates overlying said flanges and attached to the exterior cylinder surface, substantially as set forth.

20. In an envelop machine, the combination substantially as described, of the rotatable bed-cylinder and gummer-cylinder, the latter provided with dual gum-applying faces for successively gumming the edge of the in-fold flap and sealing flap of an envelop blank, a support for the supply of blanks and a pair of feed-rolls closely adjacent to said cylinders, means for separately transferring the blanks from the supply to said feed-rolls, a depending swinging finger having a furcated offset end co-acting with said gummer cylinder, a runway plate having a creasing mouth, the reciprocating plunger coöperating therewith, a single pair of out-feed rolls disposed for taking the gummed blank issuing from the gummers to its position over said creasing mouth, and members for adjusting it accurately beneath the plunger; said parts being all constructed, arranged and organized for operating in the manner set forth.

21. In an envelop machine, the combination of a gumming mechanism including a rotating bed-cylinder, and a rotating gummer-cylinder carrying pads for applying gum to an envelop blank passing between said cylinders, cams mounted upon the gummer-cylinder axles, cam-engaging rolls supported adjacent thereto, a power actuated mechanism adapted for shifting said rolls into engagement with said cams for moving said gummer-cylinder bodily out of its normal contact position, an automatically actuated device including a feeler in the feedway entrance to said rotating cylinders, and an oscillatable stop-member operatively connected with said feeler, for rendering said power-actuated mechanism inactive when a blank passes into the gumming mechanism, but permitting action of said power-actuated mechanism when a blank is absent.

FREDERICK E. ARROUQUIER.